United States Patent Office 3,328,435
Patented June 27, 1967

---

3,328,435
3,12-DISUBSTITUTED-17-ACETAMIDO ANDROSTANES
Paul Kurath, Waukegan, Ill., assignor to Abbott Laboratories, Chicago, Ill., a corporation of Illinois
No Drawing. Filed Apr. 6, 1965, Ser. No. 446,072
8 Claims. (Cl. 260—397.45)

The present invention is concerned with steroids substituted in the 3-, 12- and 17-positions and a process for the manufacture thereof. More particularly, the invention is directed to compounds of the formula

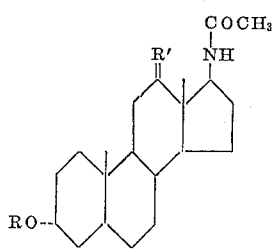

wherein R is hydrogen or an acyl radical of the formula R″CO, R″ representing lower alkyl or

HOOC—CH$_2$—CH$_2$— and, wherein R′ is oxygen

 or 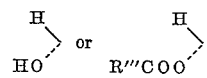

wherein R‴ represents lower alkyl. The compounds represented by the above formula are useful in the treatment of warm-blooded animals infected with schistosomiasis.

In a simple embodiment, the compounds of the present invention are prepared by refluxing 3α,12α-diacetoxy-20-oxo-5β-pregnane with hydroxylamine hydrochloride in the presence of a base in a hydroxylic solvent, e.g., methanol, ethanol or water. The formed 20-oxime is treated with p-toluenesulfonyl chloride and pyridine to effect a Beckmann rearrangement to form 17β-acetamido-3α,12α-diacetoxy-5β-androstane which can be partially or completely hydrolyzed to 17β - acetamido-12α-acetoxy-3α-hydroxy-5β-androstane or 17β-acetamido-3α,12α-dihydroxy-5β-androstane. The latter can be selectively esterified in the 3-position with succinic anhydride and the obtained 17β-acetamido - 3α - hemisuccinoyloxy-12α-hydroxy-5β-androstane may be oxidized to the corresponding 12-oxo compound, which upon hydrolysis produces the 17β-acetamido-3α-hydroxy-12-oxo-5β-androstane which can easily be converted into the corresponding 3α-acyloxy compounds.

To illustrate the above procedures, reference is made to the following examples which are not meant to limit the invention in any form. Wherever these examples refer to solvent mixtures without naming the ratio thereof, it is to be understood that the first-named solvent is used to dissolve the solid material and the other solvent is added after concentrating the solution to induce or to complete crystallization of the solid.

EXAMPLE 1

*3α-12α-diacetoxy-20-oxo-5β-pregnane 20-oxime*

A mixture of 10 grams of 3α,12α-diacetoxy-20-oxo-5β-pregnane described by Hoehn et al. in J. Am. Chem. Soc. 60, 1493 (1938), 2.75 grams of hydroxylamine hydrochloride, 3 ml. of pyridine and 125 ml. of methanol is warmed to a gentle reflux on a steam bath for 20 minutes. The solution is allowed to cool and is subsequently diluted with 200 ml. of water containing 6 ml. of glacial acetic acid. The slurry is extracted with three 400-ml. portions of chloroform. The chloroform extracts are washed three times with 200 ml. of water, combined, and dried over anhydrous magnesium sulfate. The filtered chloroform solution is evaporated to dryness, leaving a residue of 11.493 grams of a glass which is induced to crystallize from a mixture of glacial acetic acid and water 95:15. Several recrystallizations from dilute acetic acid produce a solvated sample melting at 103–105° which upon drying under high vacuum at 80° reverts to a colorless glass which analyzes correctly for the calculated formula C$_{25}$H$_{39}$NO$_5$, representing the empirical formula of 3α,12α-diacetoxy-20-oxo-5β-pregnane 20-oxime.

EXAMPLE 2

*17β-acetamido-3α,12α-diacetoxy-5β-androstane*

A mixture of 11.493 grams of the oxime of Example 1, 9.65 grams of p-toluenesulfonyl chloride, and 70 ml. of pyridine is allowed to stand at room temperature for 3 hours. The mixture is then warmed on a steam bath for 10 minutes and allowed to cool before it is diluted with about 400 ml. of 10% sulfuric acid. The resulting slurry is extracted with three 400-ml. portions of chloroform. The chloroform extracts are washed with 10% sulfuric acid, combined, dried over anhydrous magnesium sulfate, filtered, and evaporated to give 11.73 grams of the crude 17β-acetamido-3α,12α-diacetoxy-5β-androstane. This compound is purified by chromatography on 600 grams of silica gel. Elution with ethyl acetate-methanol 95:5 produces 8.67 grams of an oil. A second chromatogram of this material on 520 grams of silica gel furnishes 8.43 grams of an oil which can not be induced to crystallize. However, the structure assigned was confirmed by the infrared spectrum.

EXAMPLE 3

*17β-acetamido-12α-acetoxy-3α-hydroxy-5β-androstane*

The chromatographically purified oil from Example 2 is refluxed with 5.25 grams of potassium carbonate in 425 ml. of methanol and 52.5 ml. of water for 1 hour. After cooling, most of the methanol is removed under reduced pressure and gradually replaced with water. The suspension is extracted with chloroform and the extract is washed with water, dried over magnesium sulfate, and filtered. The filtrate is evaporated to leave 7.745 grams of a residue which is twice recrystallized from methanol-water to yield 6.536 grams of 17β-acetamido-12α-acetoxy-3α-hydroxy-5β-androstane sintering at 138° C. and melting at 142–145° C. A sample is recrystallized several times; it softens at 135° and finally forms a clear melt at 145° C. and analyzes correctly for the desired compound of the empirical formula C$_{23}$H$_{37}$NO$_4$.

EXAMPLE 4

*17β-acetamido-3α,12α-dihydroxy-5β-androstane*

A mixture of 6.536 grams of the monoacetate of Example 3, 7.39 grams of potassium hydroxide pellets, 117 ml. of methanol and 13 ml. of water is refluxed on a steam bath for 1 hour. The mixture is diluted with 25 ml. of water and the methanol is boiled off until crystallization starts. The reaction mixture is then allowed to cool and the crystals are collected on a filter and recrystallized from methanol-water. A yield of 5.46 grams of 17β-acetamido-3α,12α-dihydroxy-5β-androstane, melting at 277–279° C. is obtained; a pure sample, obtained after several recrystallizations, has a constant melting point of 280–281° and analyzes correctly for the desired compound of empirical formula C$_{21}$H$_{35}$NO$_3$.

EXAMPLE 5

*17β-acetamido-3α-hemisuccinoyloxy-12-oxo-5β-androstane*

A mixture of 4.271 grams of 17β-acetamido-3α,12α-dihydroxy-5β-androstane, 1.42 grams of succinic anhydride and 50 ml. of pyridine is warmed on a steam bath overnight. Most of the pyridine is then evaporated on a steam bath under reduced pressure and the residue is dissolved in ethyl acetate, washed with dilute hydrochloric acid and water, and dried over anhydrous magnesium sulfate. From the filtrate, the ethyl acetate is evaporated to produce a residue of 5.44 grams of 17β-acetamido-3α-hemisuccinoyloxy-12α-hydroxy-5β-androstane.

The 5.44 grams of the crude hemisuccinate are dissolved in 90 ml. of 90% acetic acid and a solution of 2.43 grams of chromium trioxide in 180 ml. of 90% acetic acid is added. The oxidation mixture is allowed to stand overnight at room temperature. The reaction mixture is then diluted with 18 ml. of methanol and allowed to stand at room temperature for a period of 2 hours, when 1 liter of water is added. The resulting mixture is extracted with 1 liter of ethyl acetate. The aqueous phase is separated and extracted with two 600-ml. portions of ethyl acetate. The organic extracts are washed with water, combined, and dried over anhydrous magnesium sulfate. Evaporation of the filtered solution produces 5.104 grams of crude 17β-acetamido-3α-hemisuccinoyloxy - 12 - oxo-5β-androstane. This compound is purified by recrystallization from methanol-water to give 3.306 grams of the pure material melting at 190–192° C.

EXAMPLE 6

*17β-acetamido-3α-hydroxy-12-oxo-5β-androstane*

A mixture of 4.022 grams of the hemisuccinate of Example 5, 2.35 grams of potassium carbonate, 200 ml. of methanol and 24 ml. of water is warmed to a gentle reflux on a steam bath for one hour. The mixture is then diluted with 100 ml. of water and most of the methanol is evaporated under reduced pressure until crystals start to form. The crystals are collected on a filter and washed several times with small amounts of water. Several recrystallizations from methanol-water yield 2.055 grams of 17β-acetamido-3α-hydroxy-12-oxo-5β-androstane, melting at 251–252°; a second crop of 0.422 gram can be separated in the same fashion from the concentrated mother liquors.

Recrystallization produces the pure compound melting at 252–253° C. of which the analytical values are in agreement with those calculated from the compound of empirical formula $C_{21}H_{33}NO_3$.

EXAMPLE 7

*17β-acetamido-3α-acetoxy-12-oxo-5β-androstane*

A mixture of 3.02 grams of the compound of Example 6, 26 ml. of acetic anhydride and 52 ml. of anhydrous pyridine is allowed to stand at room temperature overnight. The solvents are removed under reduced pressure and the residue is recrystallized twice from acetone to give 2.252 grams of 17β-acetamido-3α-acetoxy-12-oxo-5β-androstane with a melting point of 247–248° C. An additional crop of 0.528 gram of the same material is obtained upon concentration of the mother liquors. The analysis of this compound is in agreement with the values calculated for $C_{23}H_{35}NO_4$.

When in the above example acetic anhydride is replaced by propionic anhydride, 17β-acetamido-12-oxo-3α-propionoxy-5β-androstane is obtained in the same fashion.

It will be apparent to those skilled in the art that by following the procedures outlined above, 3α,12α-diacyloxy compounds with different acyl radicals can be prepared; it will also be apparent that other media and reactants can be used to carry out the Beckmann rearrangement shown above. The combination of reagents and reaction media for this type of Beckmann rearrangement is well known and is described in detail by Donaruma and Heldt in Organic Reactions, Volume II (Wiley & Sons, New York, 1960) on pages 1–156.

The acyloxy substituents of interest at the 3α- or 12α-position are those with carbon chain lengths of 1–7 carbons; they are the lower fatty acid rests. The important starting material from which these new compounds are derived is the 3α,12α-diacetoxy-12-oxo-5β-pregnane 20-oxime. The end products defined and described above are of low toxicity with strong activity as anti-schistosomiasis drugs, showing activity when administered to warm-blooded animals by the various injection routes.

Others may practice the invention in any of the numerous ways which will be suggested to one skilled in the art by the present disclosure. All such practice of the invention is considered a part hereof provided it falls within the scope of the appended claims.

I claim:
1. 3α,12α-diacetoxy-20-oxo-5β-pregnane 20-oxime.
2. A steroid of the formula

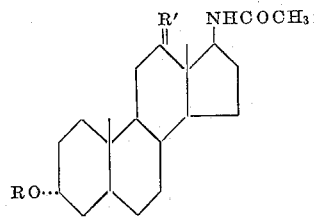

wherein R is selected from the group consisting of hydrogen, R″CO—, and HOOCCH$_2$CH$_2$CO—, and R′ is selected from the group consisting of oxygen,

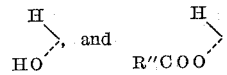

R″ representing lower alkyl.

3. 17β-acetamido-3α,12α-dihydroxy-5β-androstane.
4. 17β-acetamido-3α,12α-diacetoxy-5β-androstane.
5. 17β-acetamido-12α-acetoxy - 3α - hydroxy-5β-androstane.
6. 17β-acetamido - 3α - hemisuccinoyloxy - 12 - oxo-5β-androstane.
7. 17β-acetamido-3α-hydroxy-12-oxo-5β-androstane.
8. 17β-acetamido-3α-acetoxy-12-oxo-5β-androstane.

References Cited

UNITED STATES PATENTS 3,004,993   10/1961   Wettstein et al. _ _ _ _ 260—397.45

OTHER REFERENCES

Djerassi-Steroid Reactions, page 411 (1963), Holden Day, San Francisco, Calif.

LEWIS GOTTS, *Primary Examiner.*

HENRY A. FRENCH, *Assistant Examiner.*